(12) United States Patent
Yan et al.

(10) Patent No.: US 8,077,717 B2
(45) Date of Patent: Dec. 13, 2011

(54) METHOD AND SYSTEM FOR PROVIDING MULTICAST SERVICES

(75) Inventors: Jun Yan, Shenzhen (CN); Xiangyang Wu, Shenzhen (CN); Jincheng Li, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 322 days.

(21) Appl. No.: 12/481,346

(22) Filed: Jun. 9, 2009

(65) Prior Publication Data
US 2009/0245256 A1    Oct. 1, 2009

Related U.S. Application Data

(63) Continuation of application No. PCT/CN2008/070154, filed on Jan. 22, 2008.

(30) Foreign Application Priority Data

Jan. 22, 2007 (CN) .......................... 2007 1 0006006

(51) Int. Cl.
  H04L 12/28 (2006.01)
(52) U.S. Cl. ........ 370/390; 370/312; 370/431; 370/432; 709/223; 709/227; 713/163
(58) Field of Classification Search .................... None
  See application file for complete search history.

(56) References Cited

U.S. PATENT DOCUMENTS

| 2004/0249949 | A1 | 12/2004 | Gourraud et al. | |
| 2005/0135365 | A1 | 6/2005 | Sung et al. | |
| 2006/0126621 | A1* | 6/2006 | Bedi et al. | 370/389 |
| 2006/0268873 | A1* | 11/2006 | Tonjes et al. | 370/392 |
| 2007/0211720 | A1* | 9/2007 | Fuchs et al. | 370/390 |
| 2007/0220573 | A1* | 9/2007 | Chiussi et al. | 725/114 |
| 2008/0065548 | A1* | 3/2008 | Muijen | 705/51 |

FOREIGN PATENT DOCUMENTS

| CN | 1848770 A | 10/2006 |
| CN | 1881913 A | 12/2006 |
| JP | 2006-101475 | 4/2006 |
| WO | 2006/044069 A1 | 4/2006 |

OTHER PUBLICATIONS

Bodzinga, Anne et al. "Interworking IPTV Services with IMS" Telecommunications Network Strategy and Planning Symposium, 2006. Nov. 2006: pp. 1-5.

Caja, Javier "Optimization of IPTV Multicast Traffic Transport Over Next Generation Metro Networks" Telecommunications Network Strategy and Planning Symposium,2006. Nov. 2006: pp. 1-6.

(Continued)

Primary Examiner — Ayaz Sheikh
Assistant Examiner — Nicholas Sloms
(74) Attorney, Agent, or Firm — Brinks Hofer Gilson & Lione

(57) ABSTRACT

The present disclosure discloses a method for providing multicast services, which includes receiving a multicast service request sent by a UE through an IMS network, obtaining the media transmission parameters of the multicast media streams, sending a response to the UE through the IMS network with the media transmission parameters carried in the response, and sending the multicast media streams corresponding to the media transmission parameters to the UE. Further, a system providing multicast services and a multicast service support system is disclosed.

19 Claims, 10 Drawing Sheets

OTHER PUBLICATIONS

International Search Report issued in corresponding PCT Application No. PCT/CN2008/070154; mailed May 8, 2008.

Friedrich, Oliver et al. "Evolution of Next Generation Networks Towards an Integrated Platform for IMS-Based IPTV Services" Applications and the Internet Workshops—Proceedings of the International Symposium IEEE. Jan. 15, 2007.

Arkko, J. et al. "MIKEY: Multimedia Internet KEYing" The Internet Society. Aug. 2004.

Whitehead, S. "An Evaluation Session Initiation Protocol (SIP) for use in Streaming Media Applications; draft-whitehead-mmusic-sip=for streaming-media—02.txt." Internet Society. Oct. 22, 2006.

"Telecommunications and Internet Converged Services and Protocols for Advanced Networking (TISPAN); NGN Functional Architecture Release 1." ETSI Standard. Aug. 2005.

"Telecommunications and Internet Converged Services and Protocols for Advanced Networking (TISPAN); Resource and Admission Control Sub-system (RACS); Functional Architecture." ETSI Standard. Jun. 2006.

"Telecommunications and Internet Converged Services and Protocols for Advanced Networking (TISPAN); IPTV Architecture; IPTV Functions Supported by theism Subsystem" ETSI Standard. Dec. 2006.

"Digital Cellular Telecommunications System (Phase 2+); Universal Mobile Telecommunications System (UMTS); IP Multimedia Subsystem (IMS); Stage 2. (3GPP TS 23.228 version 7.6.0 Release 7)." 3GPP—Standards. Dec. 2006.

"$3^{rd}$ Generation Partnership Project; Technical Specification Group Core Network and Terminals; Open Service Access (OSA); Parlay X Web Services; Part 20: Multimedia Multicast Control (Release7)." 3GPP—Standards. Dec. 2006.

Written Opinion of the International Searching Authority issued in corresponding PCT Application No. PCT/CN2008/070154; issued May 8, 2008.

Office Action issued in corresponding Chinese Patent Application No. 200710006006X; issued Jun. 19, 2009.

Office Action issued in corresponding Chinese Patent Application No. 200710006006X; issued Mar. 1, 2010.

Supplementary European Search Report issued in corresponding European Patent Application No. 08 70 0811; issued Mar. 5, 2010.

Office Action issued in corresponding Russian Patent Application No. 2009131733/09 (044474).

European Communication issued in corresponding European Patent Application No. 08700811.6, mailed Sep. 10, 2010. 6 pages.

* cited by examiner

METHOD AND SYSTEM FOR PROVIDING MULTICAST SERVICES

CROSS-REFERENCE TO RELATED APPLICATIONS

This application is a continuation of International Application No. PCT/CN2008/070154, filed on Jan. 22, 2008, which claims the priority of Chinese Patent Application No. 200710006006.X, filed on Jan. 22, 2007, and entitled "Method and System for Providing Multicast Services", both of which are incorporated herein by reference in their entireties.

FIELD OF THE DISCLOSURE

The present disclosure relates to multimedia multicast technologies, and in particular, to a method and system for providing multicast services.

BACKGROUND OF THE DISCLOSURE

Nowadays, the communication and information technologies are highly developed. With the emergence of the IP technology that crosses the link layer and transmission media, the application of the Internet becomes more and more popular. People require brand-new multimedia communication modes, and are no longer satisfied with the monotone voice communication mode. It is generally accepted that the IP-based mobile communication network and fixed communication network and the convergence between the Internet and the telecom network are the main development trend. To meet the increasing requirements for IP multimedia applications, the Third Generation Partnership Project (3GPP) organization introduces an IP Multimedia Subsystem (IMS) in an all-IP service network architecture on the basis of a packet bearer network. The purpose of the IMS is to provide individualized user data, screen user access modes, control the openness of service capabilities and provide multimedia communication experiences.

The IMS is a subsystem overlaid by the 3GPP R5 onto the existing PS domain of the Wideband Code Division Multiple Access (WCDMA) network. The IMS uses the PS domain as a bearer channel for its upper-layer control signaling and media transmission, and introduces the Session Initiation Protocol (SIP) as a service control protocol. By using the features of the SIP such as simplicity, scalability and convenience of combining media, the IMS provides rich multimedia services by separating service control from bearer control.

Currently, an IMS-based system provides voice services, but no better solution is available for providing multicast services.

SUMMARY

An embodiment of the present disclosure provides a method for providing multicast services to implement IMS-based multicast services. The method includes the following steps: receiving a multicast service request sent by a User Equipment (UE) through an IMS network, and obtaining the media transmission parameters of the multicast media streams, sending a response carrying the media transmission parameters to the UE through the IMS network, and sending the multicast media streams corresponding to the media transmission parameters to the UE.

Further, an embodiment of the present disclosure also provides a multicast service support system. The system includes: a multicast address managing unit, adapted to allocate and manage multicast addresses, an address and content correlating unit adapted to create a mapping between the multicast service content and the multicast address managed by the multicast address managing unit, and a scheduling result providing unit, adapted to output the mapping created by the address and content correlating unit as a scheduling result of multicast services.

Further, an embodiment of the present disclosure provides a system for providing multicast services. The system includes (i) a service providing device adapted to query for multicast service scheduling results to obtain the media transmission parameters according to a multicast service request from a UE and send a response carrying the media transmission parameters to the UE through an IMS network, and (ii) an IMS network adapted to control the transport-layer resources according to the interaction process.

It can be seen from the preceding technical solution that, the embodiments of the present disclosure can implement the IMS-based multicast services, thus laying a strong foundation for enriching the IMS-based multicast services, especially the popular IPTV service.

DETAILED DESCRIPTION

The present disclosure is hereinafter described in detail with reference to accompanying drawings.

Figure 1:
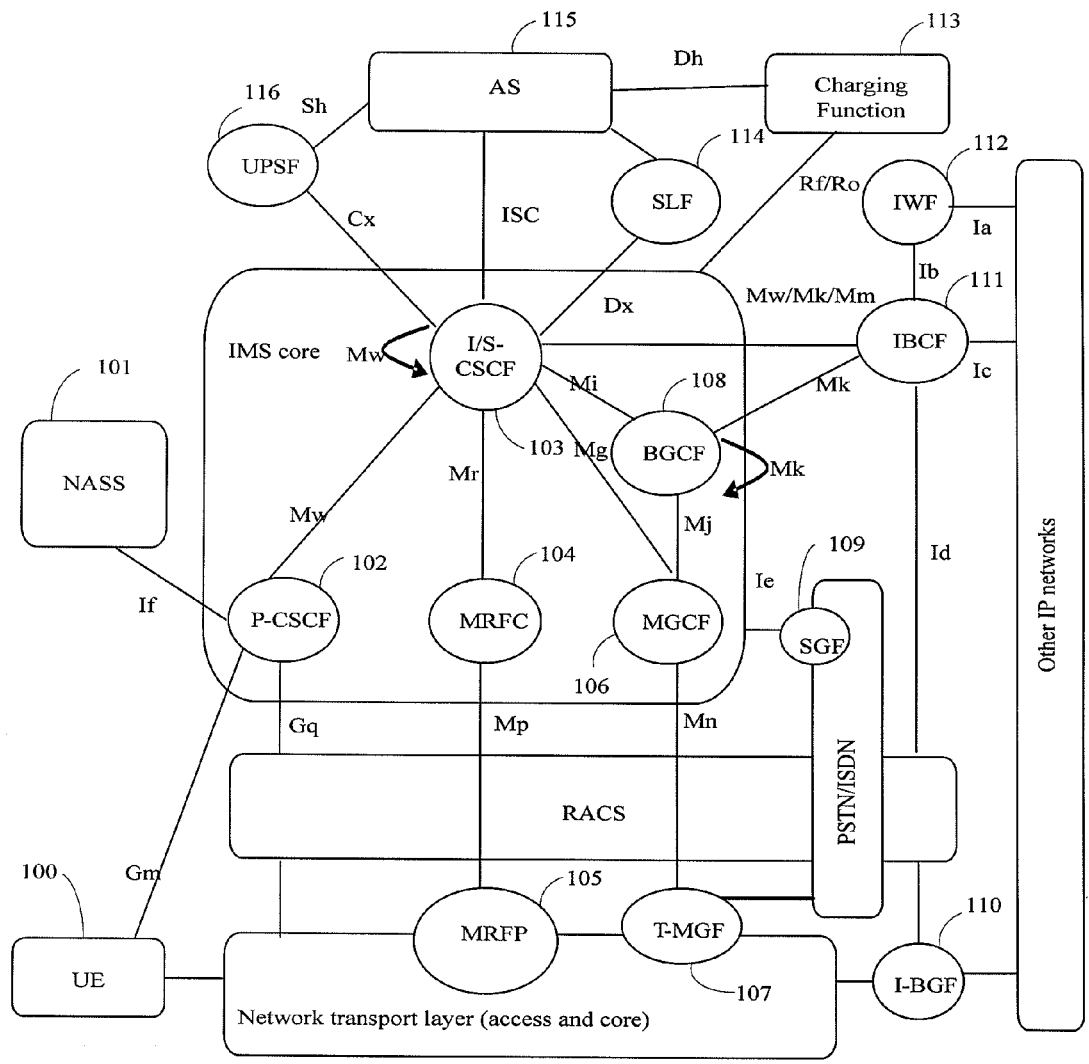
FIG. 1 shows the structure of an IMS system in the prior art.

FIG. 1 shows the network architecture of the IMS (see 3GPP TS 23.228). Main function entities include: Call Session Control Function (CSCF) which is categorized into Proxy CSCF (P-CSCF) 102 and Interrogating/Serving CSCF (I/S-CSCF) 103, Application Server (AS) 115 that provides various service logic control functions, Home Subscriber Server (HSS) that manages the subscription data in a centralized way, and Media Gateway Control Function (MGCF) 106/Transaction Multimedia Gateway (T-MGW) 107 for interworking with the Circuit Switched (CS) network. The UE 101 accesses the IMS through the local P-CSCF 102. The home S-CSCF controls triggering of sessions and services and interacts with the AS about service control.

The P-CSCF 102 and I/S-CSCF 103 are collectively called CSCF, which is adapted to provide user agent, session control, and routing functions, trigger services in an IMS network, and implement the interworking between different IMS domains; the MGCF 106, T-MGF 107 and SGF 109 are respectively the media gateway control function, media gateway function and signaling gateway function, and are adapted to implement interworking between the IMS network users and the traditional Public Switched Telephone Network (PSTN) users; the Border Gateway Control Function (BGCF) entity 108 is used for addressing and routing between MGCF entities of different IMS domains; the Subscriber Location Function (SLF) entity 114 is used for selection among multiple User Profile Service Function (UPSF) entities 116; the Interconnect Border Control Function (IBCF) entity 111 and the Interconnect Border Gateway Function (IBGF) 110 are function entities for interworking between IMS domains; the Media Resource Function Controller (MRFC) 104 and the Media Resource Function Processor (MRFP) 105 are collectively called Media Resource Function (MRF), which is adapted to allocate, control and process media resources; the Network Attachment Sub-system (NASS) 101 is used for user access authentication and address allocation; the Resource and Admission Control Subsystem (RACS) 117 is adapted to control the bearer network according to the requirements of the service layer such as IMS.

The streaming service or IPTV service is a new service which has developed rapidly over the past few years. The streaming service transmits multimedia files (including videos and audios) on a PS network, and the network device for storing such multimedia files is called a "streaming source". A user can play the multicast media contents promptly without downloading the multimedia files completely. The essence of implementing streaming media is the streaming transmission technology, which processes continuous video and audio information and stores the information into the streaming source, so that the UE plays the media stream while downloading, without waiting for completion of downloading the whole file to the local device.

If more than one user wants to receive the same service content at a time, the multicast technology may be applied so that the service sender (i.e., the streaming source) sends a media stream to the specified multicast address. To obtain the multicast content, the service receiver (i.e., the UE) joins a service multicast group (e.g., by using the Internet Group Message Protocol, IGMP) to require the adjacent router to send the service content to the UE. Routers interwork with each other through a multicast routing protocol (e.g., Protocol Independent Multicast—Sparse Mode, PIM-SM, protocol) to create a multicast forwarding path. In this way, the multicast service content can be sent to the content receiver from the multicast source along the multicast forwarding path. When a service stream is transferred through the multicast technology, the service sender only needs to send one service stream regardless of the number of receivers. Only one data stream is generated along the transmission path from the sending point of the multicast data to the transfer point of the receiver. Obviously, the multicast technology reduces the load of the service sender, and utilizes network resources effectively.

A typical example of multicast services is the Live Television (LTV) service. For all users who watch the same program, the program contents received at a time are exactly the same. Therefore, the network bandwidth requirements can be reduced by means of bearer-layer multicast. The multicast mode may be applicable to a scenario where the same service content is sent to multiple users at a time. The service may be considered to be multicast service. For example, for a multi-party conference, the audio and video information of the speaker may be sent to the conference server before being sent to multiple users in a multicast way, which is also regarded as an application of multicast services.

Figure 2:
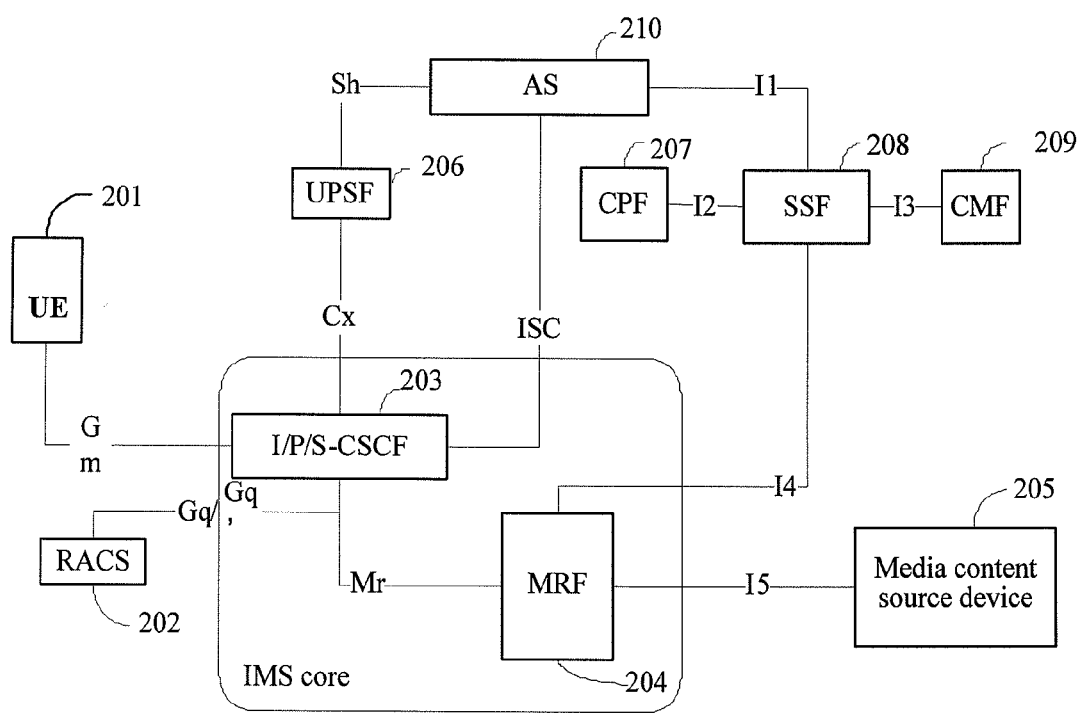
FIG. 2 shows the system for providing multicast services in an embodiment of the present disclosure.

An embodiment of the present disclosure provides an IMS-based multicast service system, the network architecture of which is shown in FIG. 2. The function entities or components such as UE 201, RACS 202, MRF 204, UPSF 206, AS 210 and the interfaces such as ISC, Gm, Gq/Gq', Mr, Sh, and Cx have been defined in the existing Telecommunication and Internet converged Services and Protocols for Advanced Networking (TISPAN) standards.

The AS 210 is adapted to provide logic control functions of services. For a control plane, the AS 210 is an entity that provides services for the UE 201, and can be called a service provision device.

The media content source device 205 is adapted to provide multicast media contents for the MRF 204, and is an entity of the content provision layer. The media content source device is provided here for better description of the service scheduling process only. Here the MRF serves as a source of the multicast media stream.

This system further includes: a Content Protection Function (CPF) 207, a Service Scheduling Function (SSF) 208, and a Content Management Function (CMF) 209.

The SSF 208 is adapted to schedule and organize IPTV services. The SSF 208 includes:

a multicast address managing unit, adapted to allocate and manage multicast addresses;

an address and content correlating unit, adapted to create a mapping between the multicast service content, the content source location information, and the multicast address managed by the multicast address managing unit, wherein the multicast service content and the content source location information come from the CMF 209;

a scheduling result providing unit, adapted to output the mapping created by the address and content correlating unit as a scheduling result of multicast services, namely, schedule the multicast media stream into the multicast source, namely, the MRF 204; schedule the media transmission parameters of the multicast service to the AS210 and/or UE 201, wherein the multicast service scheduling result include a multicast address, a content location. Further, the multicast service contents include a SEK and/or TEK sent from the CPF 207.

The CPF 207 is adapted to provide a media security protection mechanism for the multicast media contents delivered in the multicast service so as to prevent piracy of the contents. The CPF 207 uses a Conditional Access (CA) or service layer protection mechanism to generate and manage a Service Encryption Key (SEK) and/or a Traffic Encryption Key (TEK). The CPF 207 may include the following units:

a SEK generating unit, adapted to generate a SEK, or update the SEK according to the indication sent by the scheduling result providing unit in the SSF 208;

a TEK generating unit, adapted to generate a TEK, or update the TEK according to the indication sent by the scheduling result providing unit in the SSF 208;

a transceiver unit, adapted to receive the indication from the SSF unit, send the indication to the SEK generating unit and/or TEK generating unit; send the SEK from the SEK generating unit and/or the TEK from the TEK generating unit to the scheduling result providing unit in the SSF208; and a CMF 209, adapted to manage the content source information of the multicast services, and send the managed contents to the SSF 208. The managed content source information includes: content ID, content metadata, content source location information, or combination thereof. The content ID is a unique index ID of all or part of the contents/channels available from the system. The content metadata includes description about the content/channel, for example, content introduction, channel description, and media format. The content source location information may be the centralized storage location of the service provider, or a storage address of the content provider, or a media port of the live content provider. The CMF 209 supports other entities in adding, deleting, modifying and querying contents.

The CPF 207, SSF 208 and CMF209 may be mutually independent entities in the system, as shown in FIG. 2, or may be integrated into a network entity called a multicast service support device.

The following describes the new interfaces:

I1: an interface between the AS 210 and the SSF 208. Through the I1 interface, the AS 210 can query for the multicast service scheduling result in the SSF 208 during the service request, for example, provide a multicast address of the multicast service, and the encoding/decoding information of the multicast media stream; besides, the AS 210 can interact with the SSF 208 about dynamic service scheduling through the I1 interface in the real-time session.

I2: an interface between the SSF 208 and the CPF 207. The I2 interface is used by the SSF 208 to obtain key information of multicast service protection from the CPF 207, including a service protection key and/or a media protection key.

I3: an interface between the SSF 208 and the CMF 209. The SSF queries for the location of the multicast media content and the meta-description information through the I3 interface.

I4: an interface between the SSF 208 and the MRF 204. Through the I4 interface, the SSF requests the MRF to schedule the multicast services.

I5: an interface between the media content source device 205 and the MRF 204. The multicast media contents of the multicast media stream on the media content source device 205 are transferred to the MRF204 through the I5 interface. The protocol for transferring multicast media contents may be the File Transfer Protocol (FTP) or the Real-Time Transfer Protocol (RTP).

The multicast service process is hereinafter divided into three logical parts: initial service scheduling, service request signaling process in the control plane, and the multicast process in the data plane. The three logical parts are hereinafter described in detail.

The service scheduling process is designed to pre-schedule multicast media streams in the network. The initial multicast media contents may come from a content provider, and may be sent to the MRF 204 in a certain way. Here the sending mode is not limited because it does not affect the essence of the present disclosure. The MRF 204 performs multicast encapsulation and transmission for the received multicast media contents. The destination IP address of the multicast media stream is a multicast address. The destination address is not specific to a user. Therefore, the multicast media stream can be scheduled in advance no matter whether a user requests a multicast service or not.

The service request signaling process is a process in which a user interacts with the service server to obtain the transmission parameters of the multicast media stream.

For different access network technologies, the multicast processing mechanism of the access part is different. Therefore, after the user obtains the multicast service transmission parameters, the user must interact with the data plane that is specific to the access technology. The present disclosure only takes the General Packet Radio Service (GPRS) access technology as an example. Use of other access technologies does not affect the application of the present disclosure.

Figure 3:
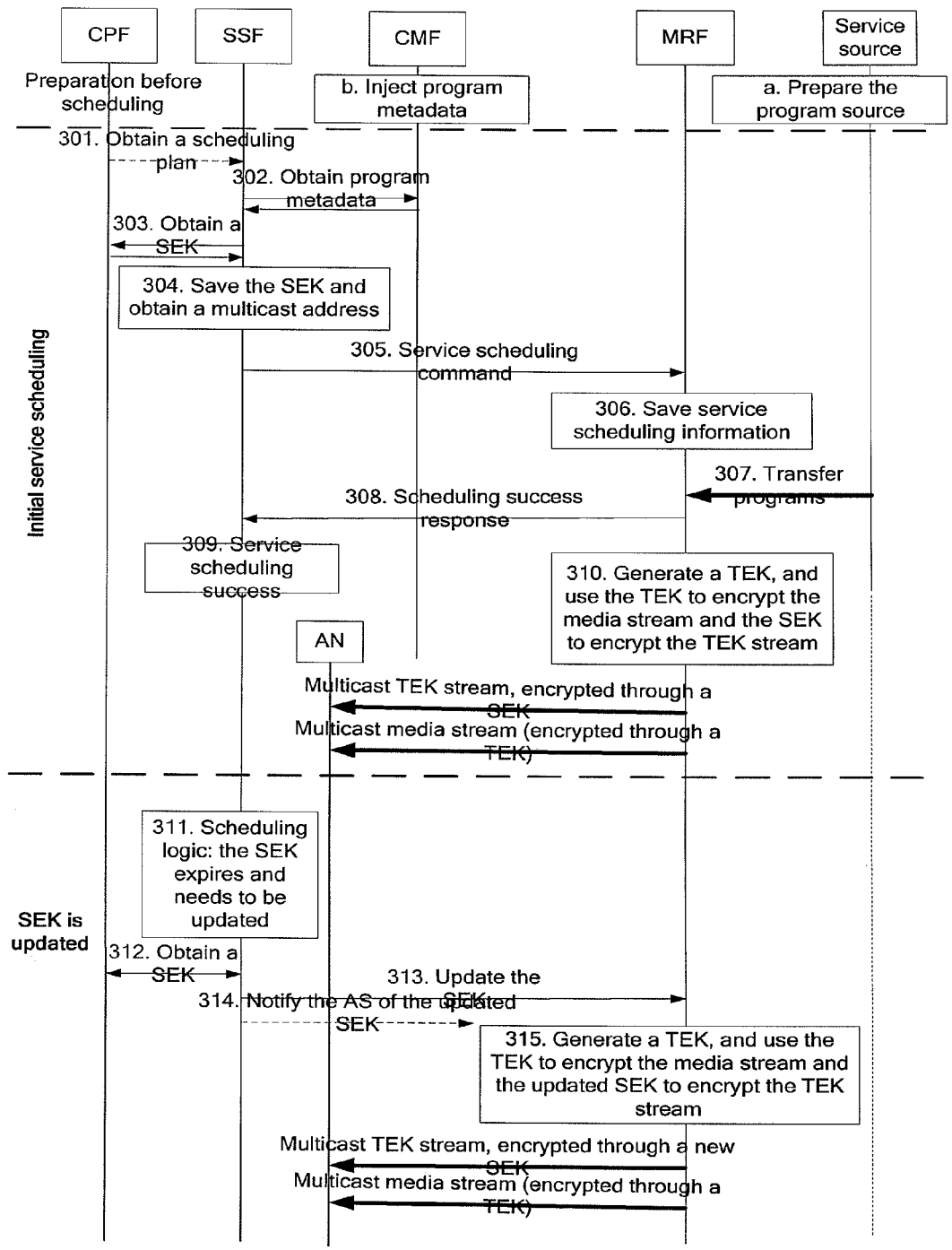
FIG. 3 shows the process of scheduling multicast services in a first embodiment of the present disclosure.

FIG. 3 shows the process of scheduling multicast services in the first embodiment of the present disclosure. Suppose that the service network protects the service contents in the scheduling process. The SEK is generated by the CPF, and is sent to the MRF through an SSF. The TEK is generated by the MRF dynamically, protected by a service key, and sent from the MRF to the UE in the multicast mode (for example, RFC3830 MIKEY protocol). The multicast address can be managed by the SSF, or the SSF obtains the multicast address from other entities that manage multicast addresses in the network.

Step a and step b are preparatory processes before service scheduling, and do not affect the specific scheduling process.

Step a: The content provider or the service provider prepares the multicast media contents, and stores the prepared multicast media contents into the media content source device.

Step b: The CMF obtains the content metadata and the content source address. The content metadata contains the content description information of the service contents stored in the media content source device, for example, content ID (CID), content introduction, content encoding/decoding format, or combination thereof. The content source address is the address of contents stored in the media content source device. The content metadata may contain content protection information. The content metadata may come from a content provider, or a system interface of the service provider.

A multicast service scheduling process includes the following steps:

Step 301: The SSF obtains a service scheduling plan. The service scheduling plan may be injected into the SSF by the Operating Support System (OSS) or Business Support System (BSS), or be a dynamic scheduling plan triggered by a user service request.

Step 302: The SSF obtains content metadata from the CMF according to the service scheduling plan, including Channel ID (ChID), content source location information, and CPF address.

Step 303: The SSF obtains SEK information for service protection from the CPF according to the service protection requirements. The SEK is sent to the MRF to encrypt the TEK stream. The service protection requirements are preset.

Step 304: The SSF obtains and stores the multicast address/port information of the program. The multicast address/port information may be managed by the SSF, or obtained from other Network Elements (NEs) that manage multicast addresses/port information in the network.

Step 305: The SSF sends a content scheduling command/request to the MRF, with the command/request carrying the SEK, multicast address/port information, content metadata and the service content that the MRF needs to obtain from the media content source device.

Step 306: The MRF stores the SEK, multicast address/port information and content metadata for program processing.

Step 307: According to the content source address, the MRF obtains service contents from the media content source device. The service contents are sent to the MRF in the unicast or multicast mode.

Step 308: The MRF sends a scheduling success response to the SSF.

Step 309: The SSF updates the local scheduling records according to the response, and determines that the service and the content ID are available.

Step 310: The MRF generates a TEK, and uses the TEK to encrypt the media stream and the SEK to encrypt the TEK stream. The media stream encrypted by the TEK and the TEK stream encrypted by the SEK are sent in the multicast mode (for example, RFC3830 MIKEY protocol). The preceding multicast stream finally arrives at the Access Node (AN) and waits for being sent to the UE.

By now, the initial scheduling process of multicast services is complete. If the service protection key needs to be changed after the initial scheduling process, execute step 311 to step 315:

Step 311: The SSF decides to update the SEK according to the service logics. The specific practice is as follows: Set a corresponding timer at the time of generating a SEK. The duration of the timer is the validity period of the SEK. When the SSF detect that the timer times out, the SSF notifies the CPF to update the SEK.

Step 312: The CPF generates a new SEK, and the SSF obtains the new SEK from the CPF.

Step 313: The SSF sends a command for updating the SEK to the MRF, with the command carrying the new SEK obtained in step 312.

Step 314: The SSF notifies the AS of the updated SEK. If a user is currently using the service, the AS also needs to notify the new SEK to the user (see the following multicast service process).

Step 315: The MRF generates a new TEK, and uses the new TEK to encrypt the media stream and the new SEK to encrypt the TEK stream. The media stream encrypted by the TEK and the TEK stream encrypted by the new SEK are sent in the multicast mode. The preceding multicast streams finally arrive at the Access Node (AN) and wait for being sent to the UE.

Figure 4:
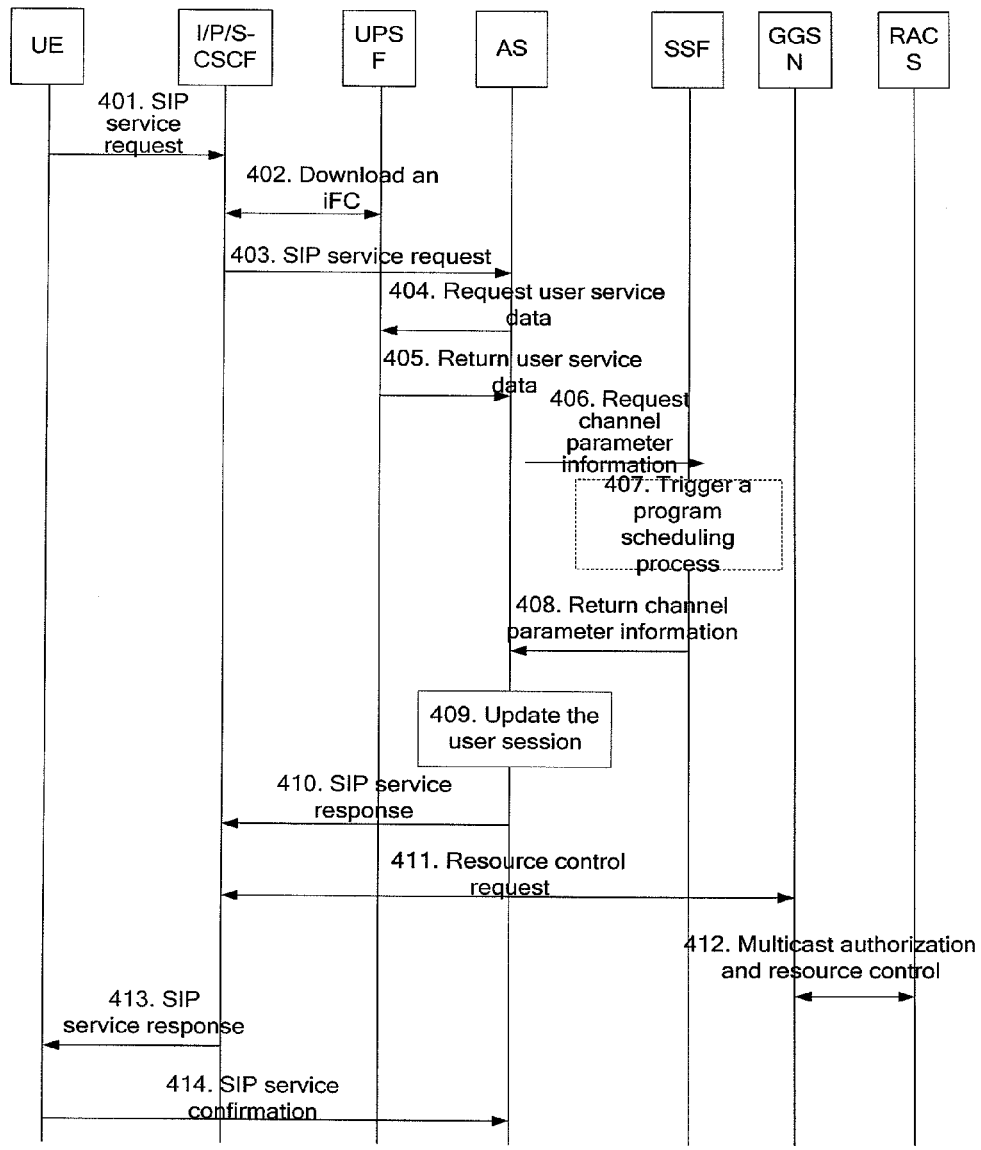
FIG. 4 shows the service request signaling process in the control plane in the first embodiment of the present disclosure.

FIG. 4 shows the service request signaling process in the control plane in the first embodiment of the present disclosure. The process includes the following steps:

Step 401: The UE selects a program through the Electronic Program Guide (EPG), and sends a SIP service request to the I/P/S-CSCF. The SIP request carries a Multicast Service Identifier (for example, PSI) and a Channel ID (ChID). The ChID is designed to identify the program contents requested by the user. For different services, the service ID and the content ID may be different. The specific sending process is as follows: The UE sends a SIP service request to the local P-CSCF, and selects the corresponding I-CSCF and S-CSCF through the route selection mechanism in the prior art. The P-CSCF then sends the SIP service request to the selected I-CSCF and S-CSCF.

Besides, a user may obtain an EPG with reference to the prior art. For example, the user can obtain an EPG through the Hypertext Transfer Protocol (HTTP) from a network entity that provides the EPG Step 402: The S-CSCF downloads the Initial Filter Criteria (iFC) from the UPSF.

Step 403: The S-CSCF matches the iFC with the PSI, selects the corresponding AS according to the matching result, and sends a service request to the selected AS. Upon receiving the request, the S-CSCF matches the specific attributes and fields carried in the signaling with the iFC, and takes the corresponding action. For example, if the service identifier in the request is LTV and the service identifier LTV defined in the iFC corresponds to a live television server, a request is sent to the specified live television server to process the service.

Step 404 to step 405: The AS requests user service data from the UPSF. The user service data includes a list of channel use rights and subscription period for users. According to the user service data from the UPSF, the AS determines the multicast service available to the UE. If no multicast service available to the UE is found, the AS rejects the multicast service request and terminates the process; if the corresponding multicast service is found, the process proceeds to step 406.

Step 406: The AS analyzes the ChID in the user service request, and requests the media transmission parameters corresponding to the ChID from the SSF. The media transmission parameters include channel multicast address/port, and encoding/decoding information.

Step 407: If the multicast service is not scheduled beforehand, the SSF needs to trigger the process of scheduling the multicast service. The scheduling process is shown in FIG. 3.

If the multicast service is scheduled, skip to step 408. If the SSF finds no corresponding multicast service contents, the SSF returns a prompt that no service content exists to the AS, and then the AS returns a message to the UE to reject the service request and terminates the process.

Step 408: If the multicast service contents are scheduled, the SSF returns media transmission parameters to the AS. The media transmission parameters include channel multicast address/port, encoding/decoding information, and SEK.

Step 409: The AS updates the user session according to the media transmission parameters and/or user service data. For example, the AS updates the channel currently used by the user.

Step 410: The AS attaches the SEK and the multicast address/port information to a response message, which is forwarded to the P-CSCF by an IMS core.

Step 411: According to the multicast address/port information carried in the response message, the P-CSCF sends a resource control request to the RACS. The resource control request is used to instruct the transport layer to allocate resources, and use the specified multicast authorization list, for example, forbid or allow a specified user to receive specific multicast streams.

Step 412: The RACS maps the application-layer command/request to the transport-layer parameters, and transfers the multicast authorization list to the access-layer gated control entity according to the user location result. In this embodiment, the access-layer gated control entity is a GPRS Gateway Support Node (GGSN) in the GPRS network. The GGSN performs multicast authorization and resource control, and establishes a multicast channel. Depending on the actual network, the access-layer gated control entity may be any other node.

Step 413: The P-CSCF forwards the response sent in step 410 to the UE.

Step 414: The UE confirms the preceding response.

The following mode may be a substitute for the preceding process:

In step 406, the AS does not request multicast service transmission parameters from the SSF, but sends a media resource request to the MRF according to the normal process of the IMS. The MRF provides the media transmission parameters according to the description of the UE media processing capability provided by the AS. For example, the MRF may schedule more than one multicast stream for the same program based on the decoding capabilities of different UEs. The multicast streams adopt different encoding/decoding formats to meet the needs of different UEs. Upon receiving a user request, the MRF returns transmission parameters of different multicast streams according to the UE capabilities, thus suiting different UEs.

Step 406 to step 408 may be replaced by the following steps:

Step 406': The AS sends a media resource request to the MRF, and the MRF negotiates with the UE about the channel transmission parameters.

Step 407': The MRF determines the media transmission parameters.

Step 408': The MRF returns media transmission parameters to the AS, including multicast address/port information, encoding/decoding information and SEK.

Moreover, in the preceding scheduling process, it is supposed that the service stream is sent before the user sends a request. In fact, the time for sending service streams may also be triggered by an initial user request. As described in step 406', upon receipt of the initial user request, the AS sends a media resource request. The MRF returns the media transmission parameters of the multicast streams, and then begins sending the multicast media streams. This way, the programs that are seldom watched are sent on demand, thus reducing the server load and the utilization of the network bandwidth resources.

If the preceding on-demand sending mode is applied, the AS can save the media transmission parameters after receiving the initial request from the UE. If a request for the same program is received from a new user and the UE can process the encoding format of the corresponding multicast stream, the AS can return the relevant parameters to the new user, thus optimizing the operation process.

Figure 5:
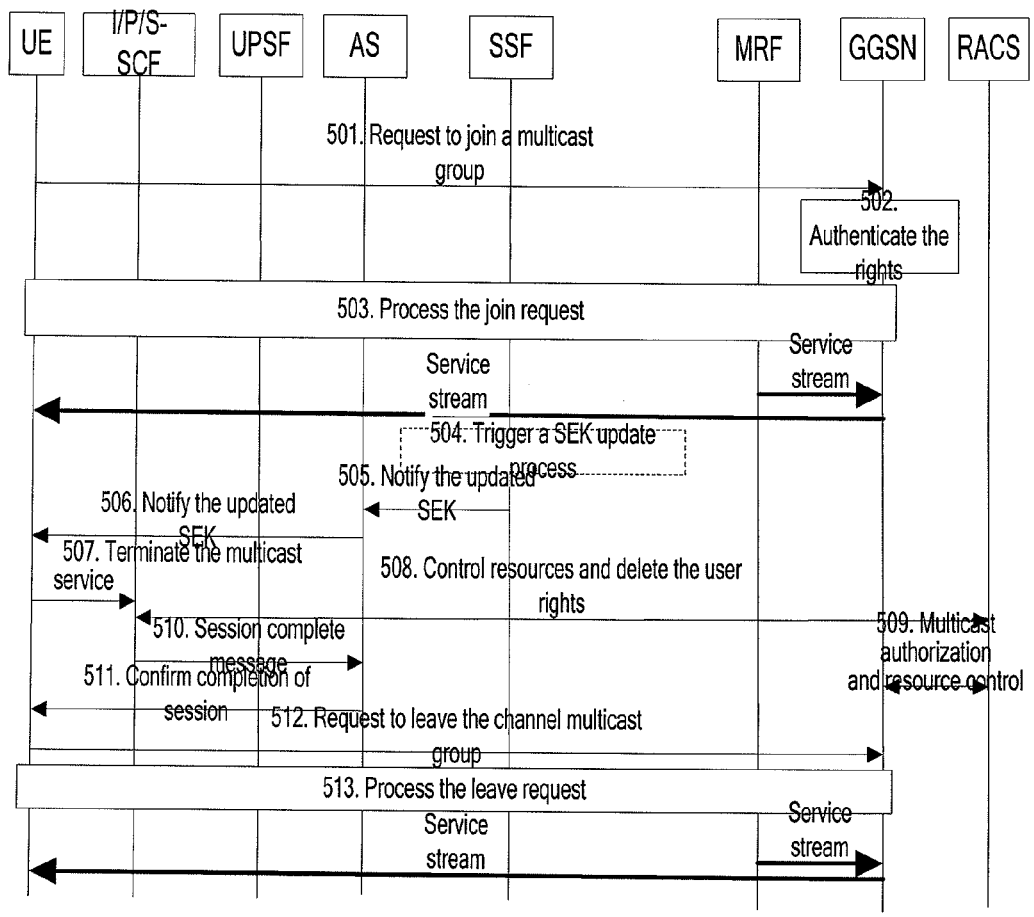
FIG. 5 shows the multicast process in the data plane in the first embodiment of the present disclosure.

After the service request is handled through the preceding process, the data-plane multicast process may be performed. As shown in FIG. 5, the data-plane multicast process includes the following steps:

Step 501: The UE sends a request for joining the specified multicast group to the access-layer gated control node, so as to receive the channel contents sent to the specified multicast address. In this embodiment, the GGSN is an access-layer gated control node, and the preceding request is received and processed by the GGSN. The preceding request can be sent with reference to the Internet Group Management Protocol (IGMP).

Step 502: After the join request is detected by the GGSN, the GGSN authenticates the rights according to the multicast authorization list. The multicast authorization list comes from the RACS. Refer to step 412 in FIG. 4.

Step 503: Processing of the join request submitted by the UE. This step varies with the type of the access network. For example, when the GPRS network provides support for the Multimedia Broadcast/Multicast Service (MBMS) as defined by the 3GPP, it is necessary to activate the MBMS context to support the multicast mode. This is clarified in the MBMS standard defined by the 3GPP.

Then the media streams flow from the MRF to the GGSN, and are sent to the UE through a multicast channel. Supposing the service protection mode is adopted, the TEK is designed to protect the media streams and the SEK is designed to encrypt the TEK streams. The SEK is transferred to the UE in the previous signaling request process, so the user can decrypt the media streams and decodes the media streams normally.

Step 504: In the service process, the SSF may trigger the update of the SEK, as described in step 311 to step 315 of the service scheduling process in FIG. 3.

Step 505: The SSF sends the updated SEK to the AS, and notifies the AS to update the SEK.

Step 506: The AS sends the updated SEK to the UE, and notifies the UE to update the SEK. This process can be performed by changing the SIP session attributes, for example, updating the SEK through SIP info. That is, the multicast media transmission parameters are carried in the SIP message, and are regarded as session attributes. The attributes can be modified by using a mechanism similar to the sending of SIP info. In this way, the relevant attributes, for example, SEK, are updated.

Step 507: When the user needs to terminate the multicast service, the UE sends a SIP BYE message to the P-CSCF to terminate the session. The SIP BYE message carries the multicast address/port information.

Step 508: The P-CSCF sends a resource control request to the RACS according to the multicast address/port information carried in the request, instructing the transport layer to perform resource control and modify or delete the specified multicast authorization list, so as to delete the UE's right of using transport-layer media streams. The multicast authorization list stores the information about forbidding or allowing the specified user to receive the specific multicast media streams. For multicast media streams, the preceding resource control may be recording or updating of the number of users only, without the necessity of releasing the resources actually upon leaving of a user because other users may be still watching the same program.

Step 509: The RACS maps the application-layer command/request to the transport-layer parameters, and transfers the multicast authorization list to the access-layer gated control entity (such as GGSN) according to the user location result, and the GGSN performs multicast authorization and resource control.

Step 510: The P-CSCF routes a session complete message to the AS.

Step 511: The AS sends a SIP BYE message to the UE to confirm completion of the session.

Step 512: The UE sends an IGMP leave message to the gated control entity GGSN, requesting to leave the channel multicast group. The IGMP leave message may also be sent when the user sends a SIP BYE message to terminate the session, which does not affect the service processing.

Step 513: The UE leaves the multicast group. Step 513 corresponds to step 503. Leaving a multicast group may involve a specific access network process; for the MBMS, the context deactivation process may be involved.

Figure 6:
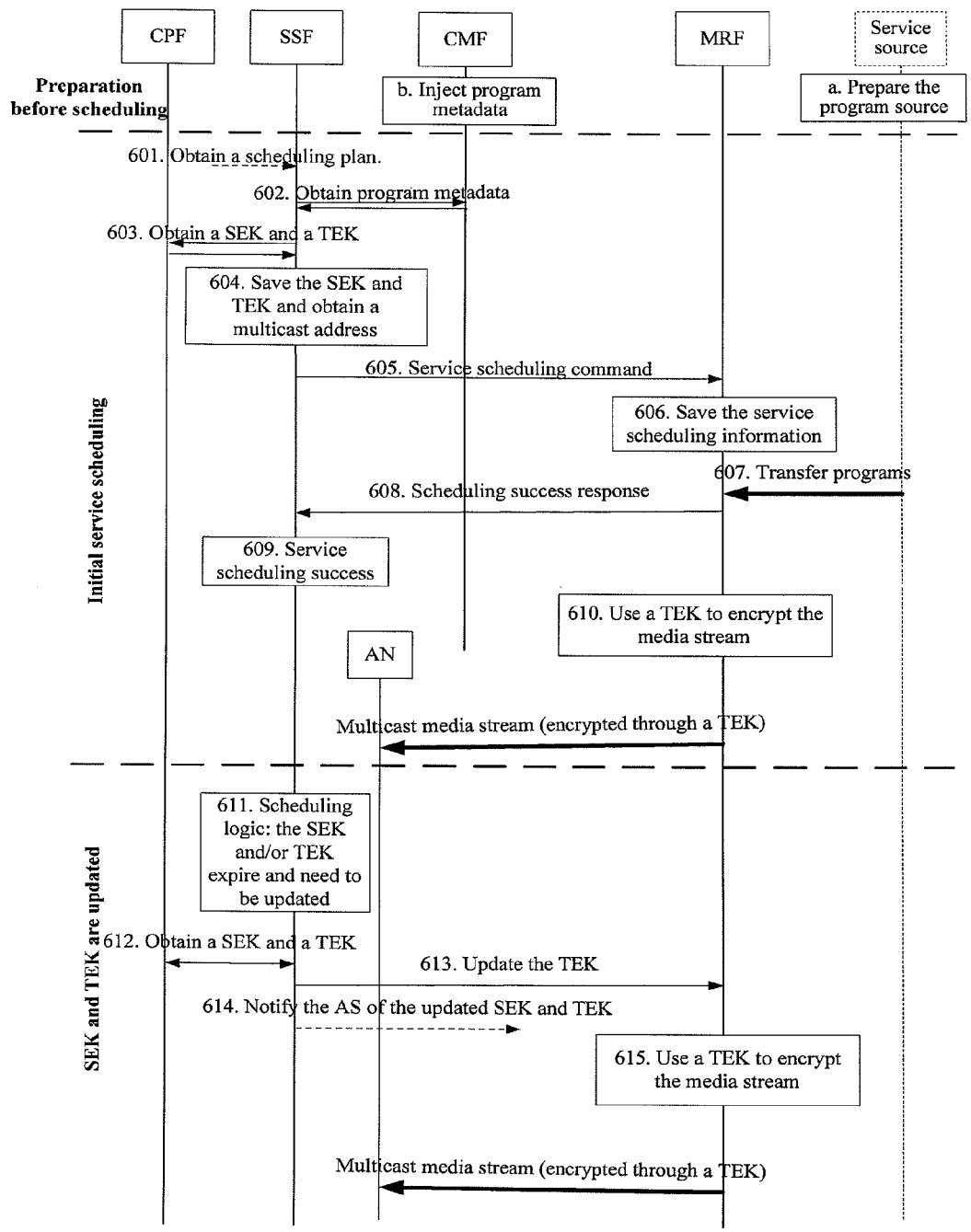
FIG. 6 shows the process of scheduling multicast services in a second embodiment of the present disclosure.

FIG. 6 shows the multicast service scheduling process according to the second embodiment of the present disclosure. Unlike the first embodiment, the second embodiment uses the SEK and TEK generated by the CPF. In the scheduling process, the TEK is transferred to the MRF for the encryption of the service stream; and the SEK and the TEK are sent to the UE through a SIP channel. Before the scheduling of a multicast service, a preparation process is performed, as described in step a and step b in FIG. 6. The process is the same as that in the first embodiment. The process of scheduling multicast services in the second embodiment includes the following steps:

Step 601: The SSF obtains a service scheduling plan. The service scheduling plan may be injected into the SSF by the OSS or BSS, or be a dynamic scheduling plan triggered by a user service request.

Step 602: The SSF obtains content metadata from the CMF according to the service scheduling plan, including Channel ID (ChID), content source location information, and CPF address.

Step 603: The SSF obtains SEK and TEK information for service protection from the CPF according to the service protection requirements. The SEK and TEK are sent to the MRF for the protection of the media encryption key.

Step 604: The SSF obtains the information such as multicast address/port applicable to the programs, and stores the obtained SEK, TEK, and multicast address/port.

Step 605: The SSF sends a content scheduling command/request to the MRF, with the command/request carrying the SEK, multicast address, content source location information, to instruct or request the scheduling of contents that the MRF needs to obtain from the media content source device.

Step 606: The MRF stores the information such as SEK, multicast address and content source address for program processing.

Step 607: According to the content source address, the MRF obtains contents from the media content source device. The contents are sent to the MRF through unicast or multicast.

Step 308: The MRF sends a scheduling success response to the SSF.

Step 309: The SSF updates the local scheduling records, and determines that the service and the content ID are available.

Step 310: The MRF uses the TEK provided by the SSF to encrypt the multicast media streams. The multicast media streams sent by the MRF to the AN contain only encrypted multicast media streams, without key streams.

By now, the initial scheduling process of multicast services is complete. When the SSF decides to update the service key according to the service policies, the SSF requests the updated SEK and TEK from the CPF. The SEK and the TEK may be updated asynchronously, namely, the TEK may be updated earlier than the SEK. In this case, the service keys may be requested separately. For example, only the SEK or TEK is requested, or both the SEK and TEK are requested. Step 611 to step 615 show the process of updating keys:

Step 611: The SSF decides to update the SEK and/or TEK according to the service logics. For details, see preceding step 311.

Step 612: The CPF generates a new SEK and/or TEK, and the SSF obtains the new SEK and/or TEK from the CPF.

Step 613: The SSF sends a command for updating the TEK to the MRF, with the command carrying the new TEK obtained in step 612.

Step 614: The SSF notifies the AS of the updated SEK and/or TEK. If a user is using the service, the AS also needs to notify the new SEK and/or TEK to the user (see the following multicast service process).

Step 615: The MRF uses the received new TEK to encrypt the media streams. The media streams encrypted by the TEK are sent through multicast. The preceding multicast streams finally arrive at the Access Node (AN) and wait for being sent to the UE.

Due to differences of the service scheduling process, the parameters carried in the multicast service process are different. Namely, the service response sent by the AS to the UE needs to carry the SEK and the TEK. After receiving the TEK, the UE can use the TEK to decrypt the received multicast media streams. Besides, the multicast media streams sent by the MRF in the process contain only encrypted media streams. FIG. 4 shows the service request signaling process in the control plane in the first embodiment of the present disclosure. The service request signaling process in the control plane in the second embodiment is similar to that of the first embodiment except the following differences:

In step 408, the media transmission parameters returned by the SSF to the AS include a TEK in addition to channel multicast address/port information, encoding/decoding information and SEK.

In step 410, the response returned by the AS to the P-CSCF needs to contain a SEK and a TEK; in step 411, the response returned by the P-CSCF to the UE needs to contain a SEK and a TEK. After receipt of the TEK, the UE can use the TEK to decrypt the received multicast media streams.

The data-plane multicast process in the second embodiment can be obtained with reference to FIG. 5, except that the media streams only include the media streams encrypted by using a TEK.

Compared with the first embodiment, the third embodiment of the present disclosure is different in the following aspects:

The SEK and the TEK are generated by the CPF, and the SEK is sent on the signaling channel (see the multicast service process in the first embodiment); the SEK and the TEK are sent to the MRF (a TEK is added in the scheduling parameters) in the service scheduling process; the use of the SEK and the TEK in the MRF and the mode of sending the TEK stream to the UE are the same as those in the first embodiment. Therefore, the process of the third embodiment may be obtained with reference to the processes shown in FIG. 3, FIG. 4 and FIG. 5 in the first embodiment.

Based on the solution provided in the first embodiment, an LTV implementation solution is given below. For other embodiments, the LTV implementation solution can be obtained according to the following description.

When originating an LTV service, the UE sends different SIP requests each time when requesting a channel. That is, channel zapping is represented as follows: terminating the previous SIP session, and then originating a new SIP request. In this mode, the process of the first embodiment shown in FIG. 3 to FIG. 5 is totally applicable, and every attempt of channel zapping is performed by terminating the current session and originating a new service request. In this case, the ChID in the process is the channel ID; the media transmission parameters include multicast address and/or port. The channel zapping process is to execute the process from FIG. 3 to FIG. 5 again.

Figure 7:
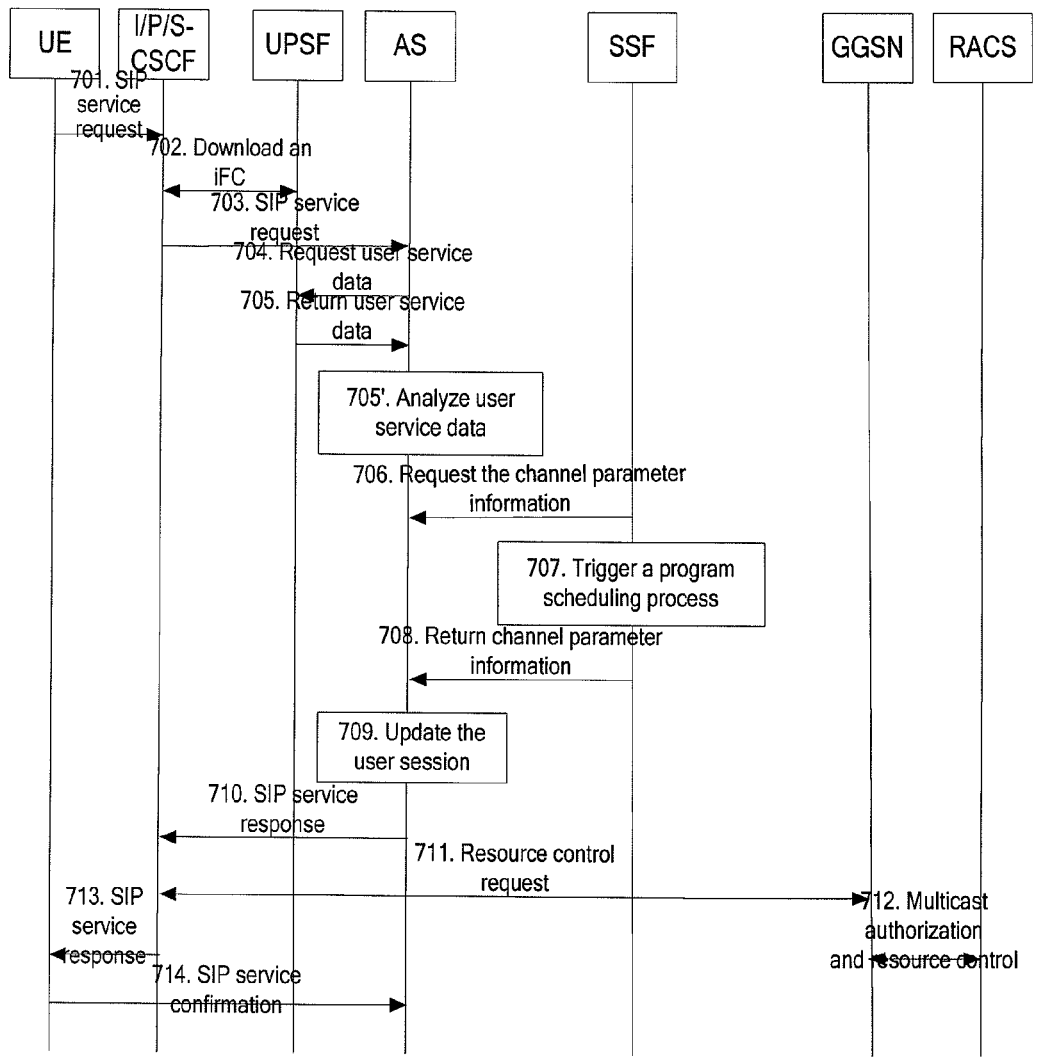
FIG. 7 shows the service request signaling process in the LTV control plane according to the method in an embodiment of the present disclosure.
Figure 8:
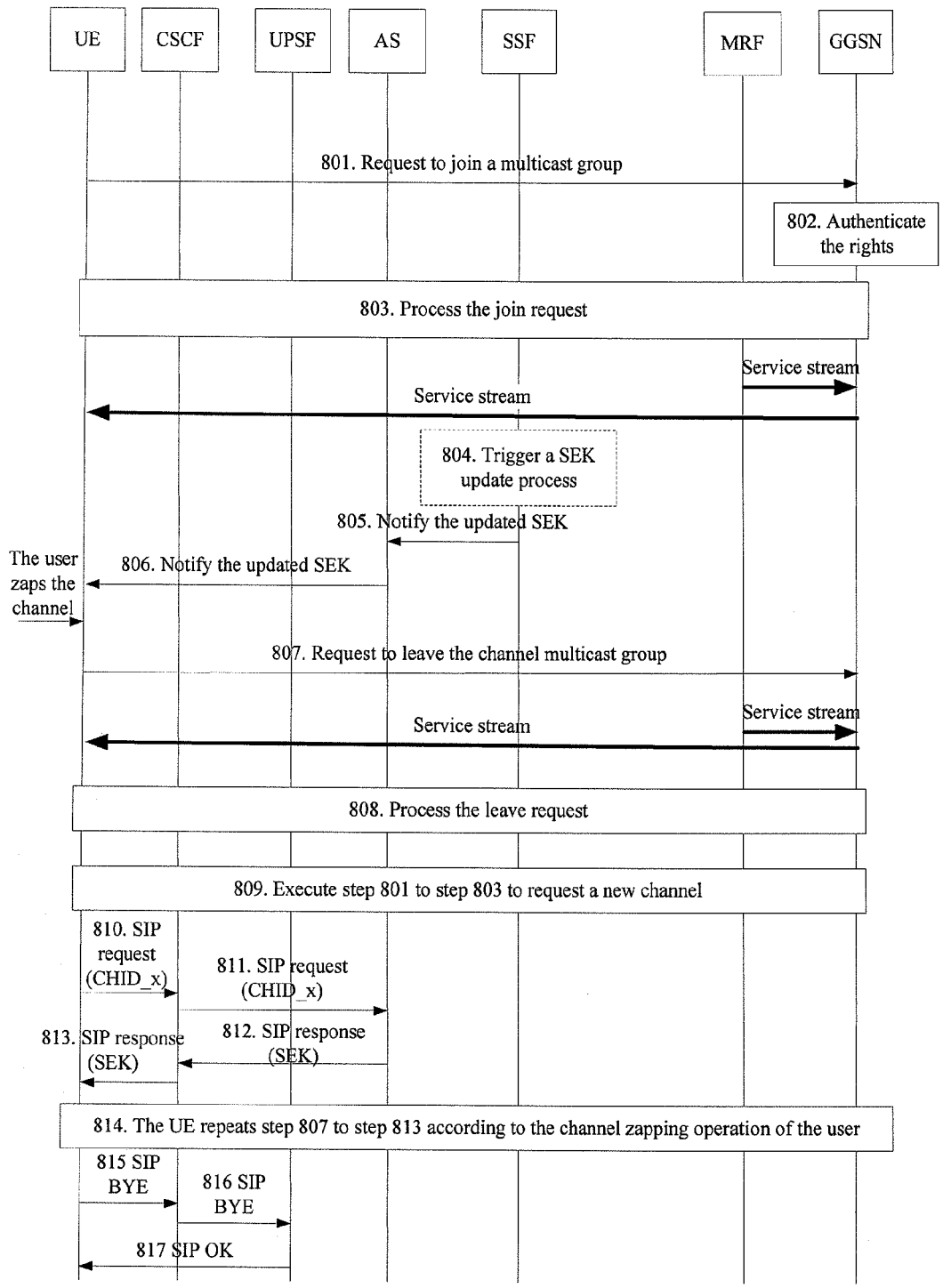
FIG. 8 shows the multicast process in the LTV data plane according to the method in an embodiment of the present disclosure.

Nevertheless, many variations may derive from the preceding mode. FIG. 7 and FIG. 8 show the process of implementing an LTV service. FIG. 7 shows a service request signaling process in the control plane, which differs from the service request signaling process shown in FIG. 4 in the following aspects:

Step 705' is added after step 705: After the AS obtains user service data, the AS analyzes the obtained user service data to obtain all channel identifiers available to the user.

Step 706: The AS analyzes the channel identifier (ChID) in the user request, and requests the SSF for the media transmission parameters corresponding to all channel identifiers available to the user. The media transmission parameters include channel multicast address/port information, and encoding/decoding information.

Step 708: The SSF returns media transmission parameters to the AS, including channel multicast address/port, encoding/decoding information, and SEK.

Step 709: The AS updates the user session, for example, it updates the channel currently used by the user; the AS adds all the obtained media transmission parameters to the response which is subsequently returned to the user. In subsequent channel zapping, it is unnecessary to re-originate new SIP service requests.

The remaining steps are the same as the counterparts in FIG. 4.

FIG. 8 shows the multicast process in the data plane, which includes the following steps:

Step 801: The UE sends a request for joining the specified multicast group to the access-layer gated control node (namely, GGSN), so as to receive the channel contents sent to the specified multicast address. The preceding request can be sent with reference to the Internet Group Management Protocol (IGMP).

Step 802: After the join request is detected by the GGSN, the GGSN authenticates the rights according to the multicast authorization list. The multicast authorization list comes from the RACS.

Step 803: Process of the join request submitted by the UE. This step varies with the type of the access network. For example, when the GPRS network provides support for the Multimedia Broadcast/Multicast Service (MBMS) as defined by the 3GPP, it is necessary to activate the MBMS context to support the multicast mode. This is clarified in the MBMS standard defined by the 3GPP.

Step 804: In the service process, the SSF may trigger the update of the SEK. For details, refer to step 311 to step 315 of the service scheduling process as shown in FIG. 3.

Step 805: The SSF sends the updated SEK to the AS, and notifies the AS to update the SEK.

Step 806: The AS sends the updated SEK to the UE, and notifies the UE to update the SEK. This process can be performed by changing the SIP session attributes, for example, updating the SEK through SIP info.

Step 807: The user originates channel zapping. The UE sends an IGMP leave request to the multicast control node (namely, GGSN), requesting to leave the current multicast group.

Step 808: Leaving a multicast group may involve a specific access network process. Taking the GPRS network as an example, the MBMS context deactivation process is involved.

Step 809: After leaving the current multicast group, the UE performs the process from step 801 to step 803 again to join a new multicast group and finish the channel zapping process. The UE receives the program on the target channel.

Step 810 to step 811: The channel-related SEK may be updated while the user is watching the program. The UE sends a channel change notification to the AS, with the notification at least containing a new ChID. The update may be performed by using a SIP info message, which is routed through the IMS network to the AS for processing.

Step 812 to step 813: The AS checks the service key SEK corresponding to the new channel, puts the latest SEK into a SIP message, and sends the SIP message to the UE. The update information may be sent by using a message such as SIP info.

Now the UE can normally receive, decode and play the service streams on the new channel.

Step 814: In the service process, the UE repeats step 807 to step 813 according to the channel zapping operation of the user.

Step 815 to step 816: The user terminates the service, and the UE sends a SIP BYE message to terminate the session. The message is routed through the IMS network to the AS for processing.

Step 817: The AS confirms the SIP BYE message sent by the UE to terminate the session.

It can be seen from the preceding process that, after the AS obtains the user service data, the AS in step 705' analyzes the user service data, requests the parameters corresponding to all channel identifiers available to the user from the SSF in step 706, and, in step 709, adds the obtained parameters to the user response which is subsequently returned to the user. Afterward, it is unnecessary to originate new SIP service requests again, and the channel zapping can be performed through a media-plane control request (for example, IGMP join/leave message).

When the SEK needs to be updated, the update may be performed by holding the SIP session. By analyzing the SEK ID used in the TEK stream, the UE judges whether it is necessary to request an updated SEK from the AS actively; or the AS can dynamically notify the updated SEK to the UE through the held SIP session after the SEK is updated. A SIP info message may be used for transferring the updated key.

During the channel zapping from step 807 to step 813, the new media transmission parameters can be requested by originating a SIP Re-Invite message. The parameter obtaining process and the channel joining process of the UE can be obtained with reference to the process shown in FIG. 8. Specifically, when the UE originates an LTV service, the UE sends a channel request through a Re-Invite message. Namely, the channel zapping is reflected by the change of ChID in the Re-Invite message. Therefore, upon receipt of an update request, the AS returns the information such as transmission parameters of the target channel. According to the returned transmission parameters, the UE performs the media-plane process (the same as that in the Invite mode).

Figure 9:
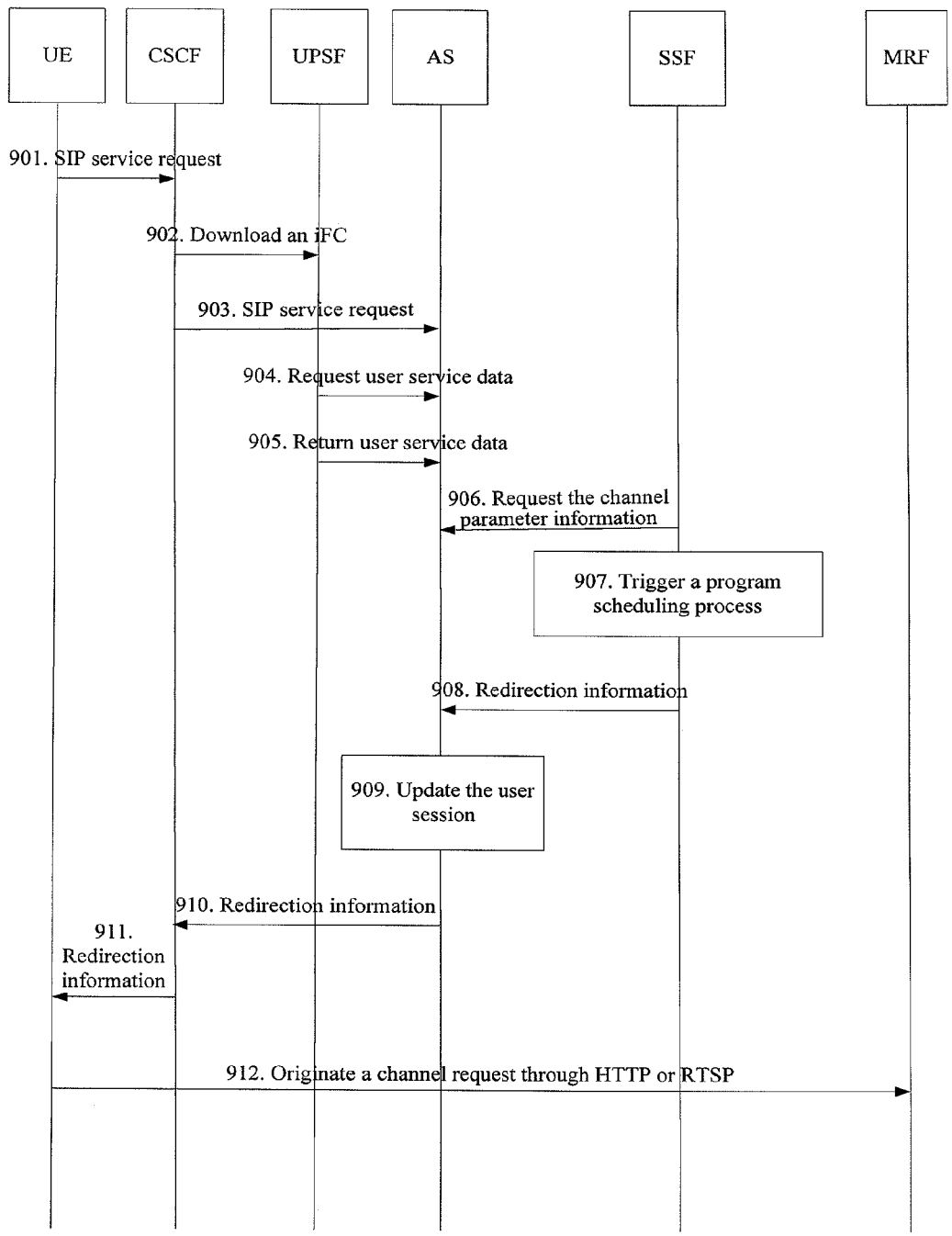
FIG. 9 shows the process of requesting LTV channels in a redirection mode.

In the process of providing an LTV service, the SIP redirection mode may be used only to enable the user to use different protocols for multicast service request. For example, the user is required to use the HTTP or the Real-time Transport Streaming Protocol (RTSP) to request a channel from the specified address. As shown in FIG. 9, the process of requesting a channel includes the following steps:

Step 901 to step 907: Same as step 401 to step 407 in FIG. 4.

Step 908: The SSF returns the relevant information corresponding to the channel. The relevant information corresponding to the channel is information about redirection of the UE, and requires the UE to use the specified protocol to access the specified address and request subsequent services. For example, the UE is required to use the HTTP or the RTSP protocol to access the specific address to perform service requesting.

Step 909: The AS updates the user session state, for example, records the information about redirecting the user.

Step 910 to step 911: The AS sends a SIP message to the UE, with the message carrying the redirection information given by the SSF. The message is routed through the IMS network to the UE.

Step 912: The UE uses a specified protocol such as the HTTP or the RTSP to send a channel request.

The subsequent steps can be obtained with reference to the process shown in FIG. 5.

An embodiment of the present disclosure proposes the following process of providing multicast services:

receiving the multicast service request sent by the UE through an IMS network, and obtaining the media transmission parameters of the multicast media streams;

sending a response carrying the media transmission parameters to the UE through the IMS network; and sending the multicast media streams corresponding to the media transmission parameters to the UE.

Figure 10:
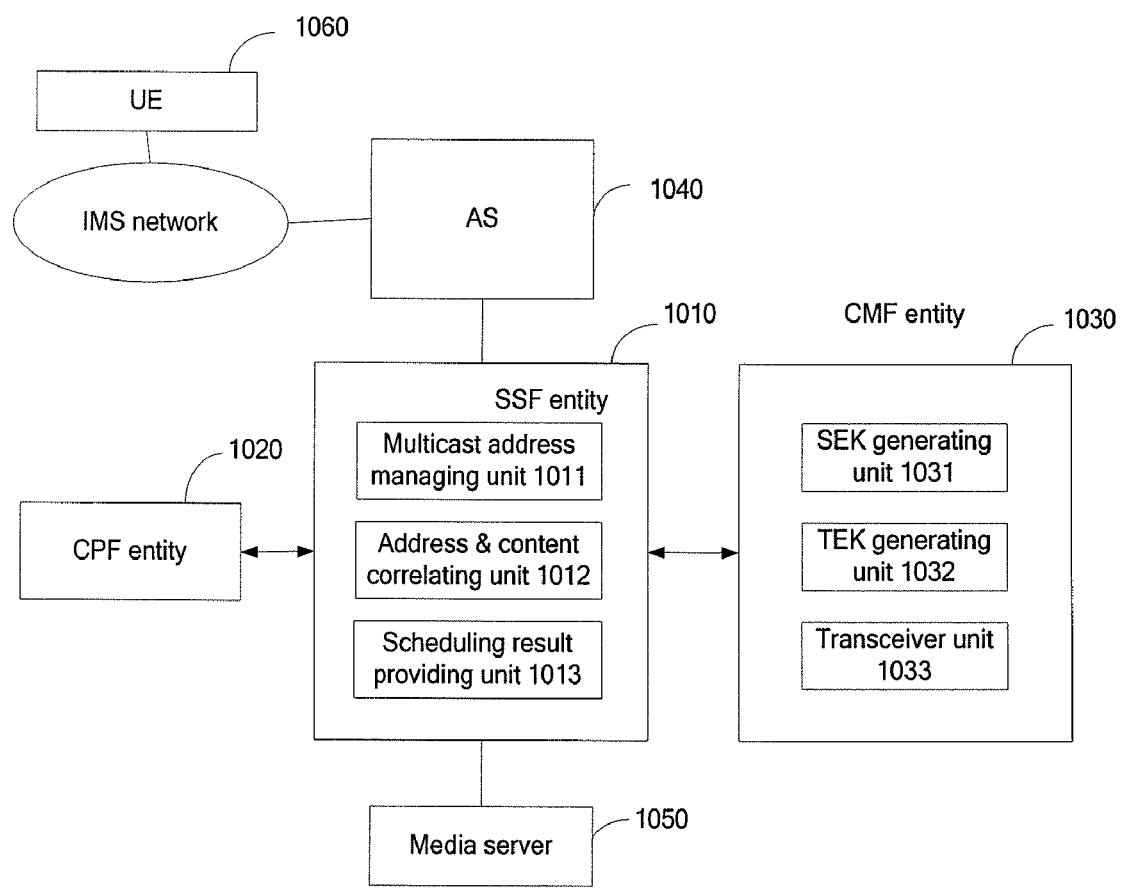
FIG. 10 shows the block diagram of the multicast service support system in an embodiment of the present disclosure.

An embodiment of the present disclosure also provides a multicast service support system, as shown in FIG. 10. The system includes:

a Service Scheduling Function (SSF) entity 1010, including:

a multicast address managing unit 1011, adapted to allocate and manage multicast addresses;

an address and content correlating unit 1012, adapted to create a mapping between the content information and the multicast address managed by the multicast address managing unit 1011; and a scheduling result providing unit 1013, adapted to output the mapping created by the address and content correlating unit as a scheduling result of multicast services to the AS 1040.

The multicast service support system may further include:

a Content Management Function (CMF) entity 1020, adapted to manage the content source information of the multicast service, and send the content source information to the address and content correlating unit 1012; and a Content Protection Function (CPF) 1030, adapted to generate a key for encrypting the multicast media contents, and send the key to the media server 1050 and/or UE through the scheduling result providing unit 1013.

The CPF 1030 further includes:

a SEK generating unit 1031, adapted to generate a SEK, or update the SEK according to the indication sent by the scheduling result providing unit 1013;

a TEK generating unit 1032, adapted to generate a TEK, or update the TEK according to the indication sent by the scheduling result providing unit 1013; and a transceiver unit 1033, adapted to receive the indication from the SSF unit 1010, and send the indication to the SEK generating unit 1031 and/or TEK generating unit 1032; send the SEK from the SEK generating unit 1031 and/or the TEK from the TEK generating unit 1032 to the scheduling result providing unit 1013.

Further, an embodiment of the present disclosure provides a system for providing multicast services. The system includes:

(i) a service providing device, adapted to query for the multicast service scheduling results to obtain the media transmission parameters according to the multicast service request sent by the UE, and send a response carrying the media transmission parameters to the UE through an IMS network; and (ii) an IMS network, adapted to control the transport-layer resources according to the interaction process.

The system for providing multicast services may further include part or all of these function entities: SSF, CMF, and CPF.

An embodiment of the present disclosure proposes an IMS-based multicast system, a process of implementing the multicast service based on such a system, and a process of implementing a typical multicast service—LTV. Further, an embodiment of the present disclosure provides a solution to scheduling multicast services, protecting multicast services, and managing contents.

Based on the embodiments of the present disclosure, those skilled in the art may obtain various solutions to implementing IMS-based multicast services without any creative work, thus laying a strong foundation for enriching the IMS-based multicast services, especially the popular IPTV service.

The preceding embodiments are exemplary embodiments of the present disclosure only and not intended to limit the present disclosure. Any modification, equivalent substitution, and improvement without departing from the spirit and principle of the present disclosure should be covered in the scope of protection of the present disclosure.

What is claimed is:

1. A method for providing multicast services, comprising:
receiving, by an application server (AS), a multicast service request sent by a User Equipment (UE) through an IMS network, wherein the multicast service request comprises a multicast service identifier and a Channel ID;
analyzing, by the AS, the Channel ID carried in the multicast service request, and requesting the media transmission parameters corresponding to the Channel ID from a Service Schedule Function (SSF);
receiving, by the AS, the media transmission parameters from the SSF, wherein the media transmission parameters comprise multicast address;
sending, by the AS, a response carrying the media transmission parameters to the UE through the IMS network; and
sending, by a Media Resource Function (MRF), multicast service media streams corresponding to the media transmission parameters to the UE;
wherein, before receiving, by the AS, the media transmission parameters from the SSF, the method further comprises:
finding, by SSF, whether multicast service content corresponding to the media transmission parameters is scheduled, and
if yes, providing the media transmission parameters;
if no, obtaining a service scheduling plan, obtaining content metadata and content source address from a Content Management Function (CMF) according to the service scheduling plan, and obtaining multicast address and/or port information;
sending, by the SSF, a content scheduling message carrying the multicast address and/or port information, the content metadata, and the content source address to the MRF; and
obtaining, by the MRF, multicast service content from a media content source device according to the content source address.

2. The method of claim 1, wherein the multicast service request is a Session Initiation Protocol (SIP) message.

3. The method of claim 1, wherein, before requesting the media transmission parameters, the method further comprises:
obtaining user service data of the UE, determining the multicast service available to the UE according to the user service data.

4. The method of claim 3, the user service data comprises a list of channel use rights and/or subscription period.

5. The method of claim 1, wherein the media transmission parameters further comprises at least one of port information or encoding/decoding information.

6. The method of claim 1, wherein, before sending, by the SSF, the content scheduling message carrying the multicast address and/or port information, the content metadata, and the content source address, to the MRF, the method further comprises:
obtaining, by the SSF, a Service Encryption Key (SEK) from a Content Protection Function (CPF) according to a preset service protection requirement; and storing the SEK;
wherein the content scheduling message further comprises the SEK,
and wherein after obtaining multicast service content from the media content source device, the method further comprises:
generating, by the MRF, a Traffic Encryption Key (TEK), obtaining multicast service media stream by encrypting the multicast service content with the TEK, and obtaining TEK stream by encrypting the TEK with the SEK.

7. The method of claim 6, wherein if the SSF determines to update the SEK according to service logics in the process of the multicast service content scheduling, the method further comprises:
generating, by the CPF, a new SEK;
obtaining, by the SSF, the new SEK from the CPF;

sending, by the SSF, a command for updating the SEK to the MRF and AS, respectively, wherein the command comprises the new SEK; and generating, by the MRF, a new TEK, obtaining multicast service media stream by encrypting the multicast service content with the new TEK, and encrypting the TEK stream with the new SEK.

8. The method of claim 1, wherein, before sending, by the SSF, the content scheduling message carrying the multicast address and/or port information, the content metadata, and the content source address, to the MRF, the method further comprises:

obtaining, by the SSF, a SEK and a TEK from a Content Protection Function (CPF) according to a preset service protection requirement, and storing the SEK and the TEK;

wherein the content scheduling message further comprises the TEK, and wherein after obtaining, by the MRF, multicast service content from the media content source device, the method further comprises:

obtaining, by the MRF, multicast service media stream by encrypting the multicast service content with the TEK.

9. The method of claim 8, if the SSF determines to update the SEK and/or TEK according to service logics in the process of the multicast service content scheduling, the method further comprises:

generating, by the CPF, a new SEK and/or TEK;

obtaining, by the SSF, the new SEK and/or TEK from the CPF;

sending, by the SSF, a command carrying the new TEK for updating the TEK to the MRF, sending an updating key command carrying the new SEK and/or TEK; and obtaining, by the MRF, multicast service media stream by encrypting the multicast service content with the new TEK.

10. The method of claim 6, wherein, before sending, by the MRF, the multicast service media streams corresponding to the media transmission parameters to the UE, the method further comprises:

performing, by the IMS network, a transport layer resource control according to the media transmission parameters; and wherein performing the transport layer resource control comprises:

updating the user session according to the media transmission parameters and/or the user service data;

returning a response message carrying the SEK, multicast address and/or port information to a Serving Call Session Control Function (S-CSCF), and forwarding the response message to a Proxy CSCF (P-CSCF);

sending a resource control request to a Resource and Admission Control Subsystem (RACS) according to the multicast address and/or port information carried in the response message, wherein the resource control request is used to instruct the transport layer to allocate resources and use the specified multicast authorization list;

transferring the multicast authorization list to the access-layer gated control entity; and performing, by the access-layer gated control entity, multicast authorization according to the multicast authorization list, and assigning network resources.

11. The method of claim 10, wherein before the sending, by the MRF, the multicast service media streams corresponding to the media transmission parameters to the UE, the method further comprises:

sending, by the UE, a request for joining the specified multicast group to a access-layer gated control node;

authenticating, by the access-layer gated control node, rights to the request for joining the specified multicast group according to the multicast authorization list; and processing the request for joining the specified multicast group after passing the authentication.

12. The method of claim 11, wherein the sending, by the MRF, the multicast service media streams corresponding to the media transmission parameters to the UE comprises:

sending, by the MRF, the multicast service media streams and the TEK streams corresponding to the media transmission parameters to the access-layer gated control node; and sending, by the access-layer gated control node, the multicast service media streams and the TEK streams to the UE.

13. The method of claim 10, wherein, after sending, by the MRF, the multicast service media streams corresponding to the media transmission parameters to the UE, the method further comprises:

sending, by the UE, a request message to terminate the multicast service to the network side; and deleting, by the network side, the UE's right of using the multicast service media streams according to the request message, and performing the process of leaving the multicast group.

14. The method of claim 13, wherein the deleting, by the network side, the UE's right of using the multicast service media streams according to the request message comprises:

sending, by the P-CSCF, a resource control request to the RACS according to the multicast address and/or port information carried in the resource control request;

instructing the transport layer to perform resource control, and modify or delete the specified multicast authorization list; and mapping, by the RACS, the application-layer message to the transport-layer parameter, and transferring the multicast authorization list to the access-layer gated control entity, wherein the access-layer gated control entity modifies or deletes the UE's right of using the multicast service media streams.

15. The method of claim 1, wherein the multicast service is Live Television service, and before receiving, by the AS, the multicast service request sent by the UE through the IMS network, the method further comprises:

originating, by the UE, channel zapping, leaving the current multicast group and entering a new multicast group through a media-plane control request; and notifying, by the UE, the channel identifier of the new multicast group to the AS.

16. The method of claim 15, wherein, after receiving, by the AS, the media transmission parameters from the SSF, the method further comprises:

returning redirection information which is used to request the UE to use specified protocol to access specified address to the UE;

wherein the UE joining the multicast group comprises:

originating a channel request through the specified protocol.

17. A system for supporting multicast service, comprising:

An Application Server (AS), configured to receive a multicast service request sent by a User Equipment (UE) through an IMS network, wherein the multicast service request comprises a multicast service identifier and a Channel ID, analyze the Channel ID carried in the multicast service request, request the media transmission parameters corresponding to the Channel ID from a Service Schedule Function (SSF), receive the media transmission parameters from the SSF, and send a response carrying the media transmission parameters to the UE through the IMS network, wherein the media transmission parameters comprise multicast address;

the SSF, configured to find whether multicast service content corresponding to the media transmission parameters is scheduled, if yes, providing the media transmission parameters to the AS; otherwise, obtain a service scheduling plan, obtain content metadata and content source address from a Content Management Function (CMF) according to the service scheduling plan, obtain multicast address and/or port information, and send a content scheduling message carrying the multicast address and/or port information, the content metadata and the content source address to a MRF;

the Media Resource Function (MRF), configured to obtain multicast service content from a media content source device according to the content source address, and send the multicast service media streams corresponding to the media transmission parameters to the UE.

18. The system according to claim 17 where the SSF is configured to obtain a Service Encryption Key (SEK) from a Content Protection Function (CPF) according to a preset service protection requirement, and store the SEK, and wherein the content scheduling message further comprises the SEK; and where the MRF is configured to generate a Traffic Encryption Key (TEK), obtain multicast service media stream by encrypting the multicast service content with the TEK, and obtain TEK stream by encrypting the TEK with the SEK.

19. The system according to claim 18, wherein the SSF is further configured to obtain a new SEK from the CPF, send a command for updating the SEK to the MRF and the AS, respectively, wherein the command comprises the new SEK;

the MRF, further configured to generate a new TEK, obtain multicast service media stream by encrypting the multicast service content with the new TEK, and encrypting the TEK stream with the new SEK.

* * * * *